(12) United States Patent
Lei et al.

(10) Patent No.: US 12,141,149 B2
(45) Date of Patent: Nov. 12, 2024

(54) FORMATTED LONG-TERM STORAGE OF STREAMING SYSTEM TO ALLOW DATA ACCESS THROUGH BOTH STREAM AND OBJECT API

(71) Applicant: DELL PRODUCTS L.P., Round Rock, TX (US)

(72) Inventors: Lu Lei, Shanghai (CN); Flavio Paiva Junqueira, Barcelona (ES); Raúl Gracia Tinedo, Barcelona (ES); Yurun Wu, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 23 days.

(21) Appl. No.: 17/972,642

(22) Filed: Oct. 25, 2022

(65) Prior Publication Data

US 2024/0134863 A1 Apr. 25, 2024
US 2024/0232205 A9 Jul. 11, 2024

(51) Int. Cl.
*G06F 16/24* (2019.01)
*G06F 16/22* (2019.01)
*G06F 16/2455* (2019.01)

(52) U.S. Cl.
CPC .... *G06F 16/24568* (2019.01); *G06F 16/2282* (2019.01)

(58) Field of Classification Search
CPC .............. G06F 16/24568; G06F 16/2282
USPC ........................................ 707/609
See application file for complete search history.

(56) References Cited

U.S. PATENT DOCUMENTS

| | | | |
|---|---|---|---|
| 8,468,244 B2 | 6/2013 | Redlich et al. | |
| 8,612,439 B2 | 12/2013 | Prahlad et al. | |
| 8,768,731 B2 | 7/2014 | Moore | |
| 9,235,941 B2 | 1/2016 | Ricci et al. | |
| 10,084,873 B2 | 9/2018 | Dornemann | |
| 10,606,633 B2 | 3/2020 | Dornemann | |
| 10,896,100 B2 | 1/2021 | Mitkar et al. | |
| 11,010,258 B2 | 5/2021 | Haridas et al. | |
| 2018/0332095 A1* | 11/2018 | Paduroiu | H04L 9/0643 |
| 2020/0167091 A1 | 5/2020 | Haridas et al. | |
| 2020/0174895 A1 | 6/2020 | Dornemann | |
| 2022/0326878 A1* | 10/2022 | Paduroiu | G06F 3/0659 |
| 2023/0091018 A1* | 3/2023 | Arnold | G06F 16/24553 |
| | | | 707/765 |

* cited by examiner

*Primary Examiner* — Hicham Skhoun
(74) *Attorney, Agent, or Firm* — Jackson Walker LLP; Christopher J. Rourk (57) ABSTRACT

A system of managing data, comprising a streaming data storage system operating on a processor that causes the processor to receive streaming data and to process the streaming data in response to an append command, a long-term storage system operating on a processor that causes the processor to receive the processed streaming data from the streaming data storage system and to generate a chunk of data, an object storage system operating on a processor that causes the processor to receive the processed streaming data from the streaming data storage system and to generate an object of data and a tables system operating on a processor that causes the processor to receive the processed streaming data from the streaming data storage system and to generate a table of data.

20 Claims, 5 Drawing Sheets

FORMATTED LONG-TERM STORAGE OF STREAMING SYSTEM TO ALLOW DATA ACCESS THROUGH BOTH STREAM AND OBJECT API

TECHNICAL FIELD

The present disclosure relates generally to data storage, and more specifically to formatted long-term storage of streaming data to allow data access through both stream and object application programming interfaces.

BACKGROUND OF THE INVENTION

Storage of streaming data is complicated by the large amount of data and the limited ability to locate relevant parts of the stored data.

SUMMARY OF THE INVENTION

A system for managing data is provided that includes a streaming data storage system operating on a processor that causes the processor to receive streaming data and to process the streaming data in response to an append command. A long-term storage system causes the processor to receive the processed streaming data from the streaming data storage system and to generate a chunk of data. An object storage system causes the processor to receive the processed streaming data from the streaming data storage system and to generate an object of data. A tables system operating on a processor causes the processor to receive the processed streaming data from the streaming data storage system and to generate a table of data.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Aspects of the disclosure can be better understood with reference to the following drawings. The components in the drawings may be to scale, but emphasis is placed upon clearly illustrating the principles of the present disclosure. Moreover, in the drawings, like reference numerals designate corresponding parts throughout the several views, and in which.

DETAILED DESCRIPTION OF THE INVENTION

In the description that follows, like parts are marked throughout the specification and drawings with the same reference numerals. The drawing figures may be to scale and certain components can be shown in generalized or schematic form and identified by commercial designations in the interest of clarity and conciseness.

Streaming data can include continuous and unbounded data generated by various sources, which can require processing of high volumes of data and high data throughput. Some common examples of streaming data include Internet of Things (IoT) sensors, server and security logs, real-time advertising and clickstream data from software applications and websites. Streaming data storage generally refers to systems that expose the stream as a storage primitive to store data in a durable, elastic and consistent manner. Generally, the most recent streaming data acquired by a streaming data storage system is cached for low-latency access, and is then migrated over time to different streaming data storage tiers for long-term storage. Long-term storage varies from all-flash storage to ensure high performance to low-cost, scale-out storage for cost savings. Independent of the long-term storage used, streaming data storage systems typically only tier data using formats that are not directly readable by applications, such as a binary format. The present disclosure provides for a novel formatted long-term storage mechanism, which enables a streaming data storage system to tier events using open formats, such as objects and commonly used file formats such as Apache Parquet™ files, available from the Apache Software Foundation of Forest Hill, MD so that large volumes of historical data are not only persisted for stream access, but also accessible via other storage APIs such as objects to enable the analysis of historical data.

With streaming data storage, the data stream can be considered as a first-class primitive for storing continuous and unbounded data. A data stream can be processed as parallel elements, such as partitions or segments, which are each an unbounded, append-only, consistent, high performance and durable sequence of bytes.

Streaming data storage can use distributed and cloud-native system infrastructure. The architecture for such infrastructure can include a software-defined storage structure formed by a control plane and a data plane. For example, Pravega®, available from the Dell Corporation of Texas, deployed on a Kubernetes® environment, available from the Linux Foundation of Oregon, includes service pods for both control and a data plane. In addition, distributed messaging systems such as Apache Kafka® and Apache Pulsar™ can be used to provide topic-based messaging that can be accommodated using tiered storage.

A durable log can be used to provide short-term, low-latency data storage, and to guarantee the durability of data written to streams. The durable log can be combined with an in-memory cache to provide low-latency data access against the latest data or other suitable data.

As data in a durable log ages, it can be automatically moved into a long-term data storage system that can be used to persist high volumes of historical data and to target high-throughput catchup reads instead of low-latency tail reads (i.e. data from the front of the stream). This process is typically referred to as two-tiered data storage. Having two storage tiers enables the ingestion of small events while ensuring both low latency and high throughput. The first tier batches writes into log appends, while the second tier separates data according to segments, but makes large writes because they are performed asynchronously, after accumulating data per segment.

Because the streaming data storage system stores data over the long term, a processing environment is usually configured to support the analysis of historical streaming data in addition to the typical use case of low-latency streaming data. For historical data, it is often desirable to process data in batches and unordered, to enable a higher degree of parallelism for processing performance.

A streaming data storage system such as Pravega® can be used to provide a streaming API for reading and writing streams, and a batch API for reading. The batch API can expose all data stream segments at once, and independent of any order. This architecture allows an application to read from all segments of a stream concurrently if it is configured to do so. The sequential nature of segments of data and the additional overhead of the streaming layer is often undesirable for historical analysis, though. Many processing engines can be used to provide direct access to a file system or object store for historical analysis, instead.

For example, Pravega® can be configured to support various storage formats for long-term storage, but might not preserve the structure of stream events, and may tier data using a binary format that is proprietary. Applications still need to load tiered data into internal services and access them through the streaming API, which is frequently inefficient for historical data analysis. This configuration may be undesirable for applications which need the ability of both tailing a stream and processing historical stream data.

A typical scenario can involve ingesting streaming data and making a copy for batch analytics. Streaming events such as pictures, sensor data and so forth that are collected from IoT sensors can be appended to a stream in the streaming data storage. With a durable log and an in-memory cache, any analytics applications that are running can obtain events with low latency through streaming reads. For historical analysis, applications can use an additional extract, transform and load (ETL) job to read the data out of streaming data storage and flush to object storage as objects or other relevant types such as files. In this case, the data can be duplicated, resulting in not only higher storage requirements but also a larger number of storage input-output operations overall. The total disk input-output operations required to build a data pipeline using this process can be represented as A (write to Long-term Storage)+A (read from Long-term Storage by ETL job)+B (write as objects) =2*A+B MB/s.

The present disclosure provides a formatted long-term storage mechanism that allows a streaming data storage system, such as Pravega® or other suitable streaming data storage systems, to tier streaming events with formats such as objects, Parquet™ files or other suitable data formats. In this manner, streaming data can be stored in additional layers to preserve the structure of events. The structure of events is not preserved when the events are stored in a binary format, and they can be split into multiple chunks (where a chunk is a unit of organization of segment data in the long-term storage). When long-term data storage stores chunks, it has no way to understand formats in the chunk.

The formatted long-term storage mechanism of the present disclosure allows streaming data storage to support multiple extensions to tier aged data into different kinds of data formats, where each extension can be specific for one kind of data format. Streaming data storage loads can thus correspond to extensions for a specific customer's application.

In one example embodiment, the present disclosure provides for a schema of an event to be retrieved. For long-term extension of an object, a global unique object identifier can be extracted from the streaming event, such as where an object identifier is set equal to a stream identifier plus an offset. In another example embodiment, an open table format designed for large (e.g., petabyte-scale) tables such as the Apache Iceberg format can be used with a long-term extension, and the stream event can be de-serialized from binary back to the source event with its schema, to allow the system to translate it to a table record and persist the data using that associated format. A similar workflow can be implemented for any suitable workflow based on its supported data format, to act as a formatted long-term extension of streaming data storage.

For object long-term extension implementation, a workflow can translate streaming events into objects, and use batch create requests to tier them into object storage. Streaming events can be aggregated, and batch writes to object storage can be implemented with object batch create requests or in other suitable manners. The requests can still be tiered in batches for high throughput. Since they are written to storage using batch create requests instead of binary chunks, every event payload added into the request is an independent object. They can consequently be accessed individually through the object API at a later time.

Object IDs in a single flush can be persisted as metadata in the streaming data storage. When an application requests historical data, the system can use object IDs in the metadata to batch read events back into streaming system, to provide catchup reading of historical data through the streaming API. This example embodiment can use object storage to provide a batch create mechanism, and further provides high read throughput against objects in a single batch.

If streaming events are small, the object data storage systems can be configured to handle massive metadata of small events efficiently. Instead of 1-1 streaming event to object mapping, a 1-N streaming event to object mapping can be used to create aggregated object like Parquet™ files, as long as reads are enabled for batch analysis.

With an object long-term extension, the architecture for the application does not require an additional ETL job. Data is stored only once, and there is no unnecessary data movement. If the disk I/O used to build the data pipeline is of the order of B MB/s (write as objects), it saves 2*A MB/s. If A==B, a 67% reduction can be obtained.

A formatted long-term storage implementation enables both streaming and historical analytics, removing the requirements of an additional ETL job, and reducing both disk I/O and data movement. Such an approach simplifies batch, historical analytics over streaming data while preserving desired properties of low-latency streaming pipelines. The object long-term extension example demonstrates one copy of stream data ingested, while exposing data for reads as both stream and object.

The present disclosure thus provides a system and method for a formatted long-term storage for streaming data storage. It enables the translation of streaming events into different kinds of data formats on different long-term storage systems. Examples of formatting stream events to objects are provided to demonstrate that technical features of the disclosure provide tangible benefits for streaming data in a stream and object out use case.

Figure 1A:
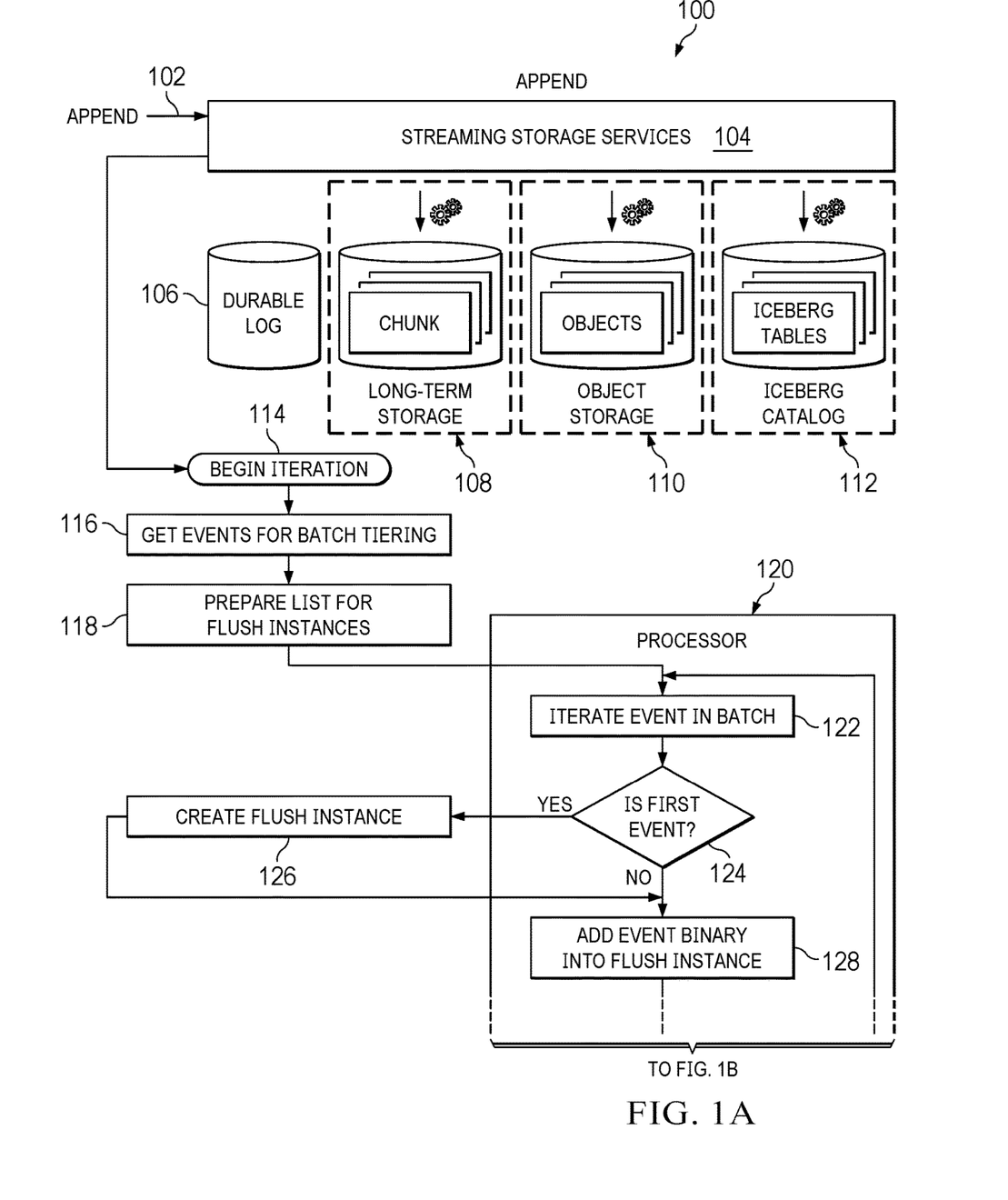
FIGS. 1A and 1B are a diagram of a system for streaming data storage, in accordance with an example embodiment of the present disclosure.
Figure 1B:
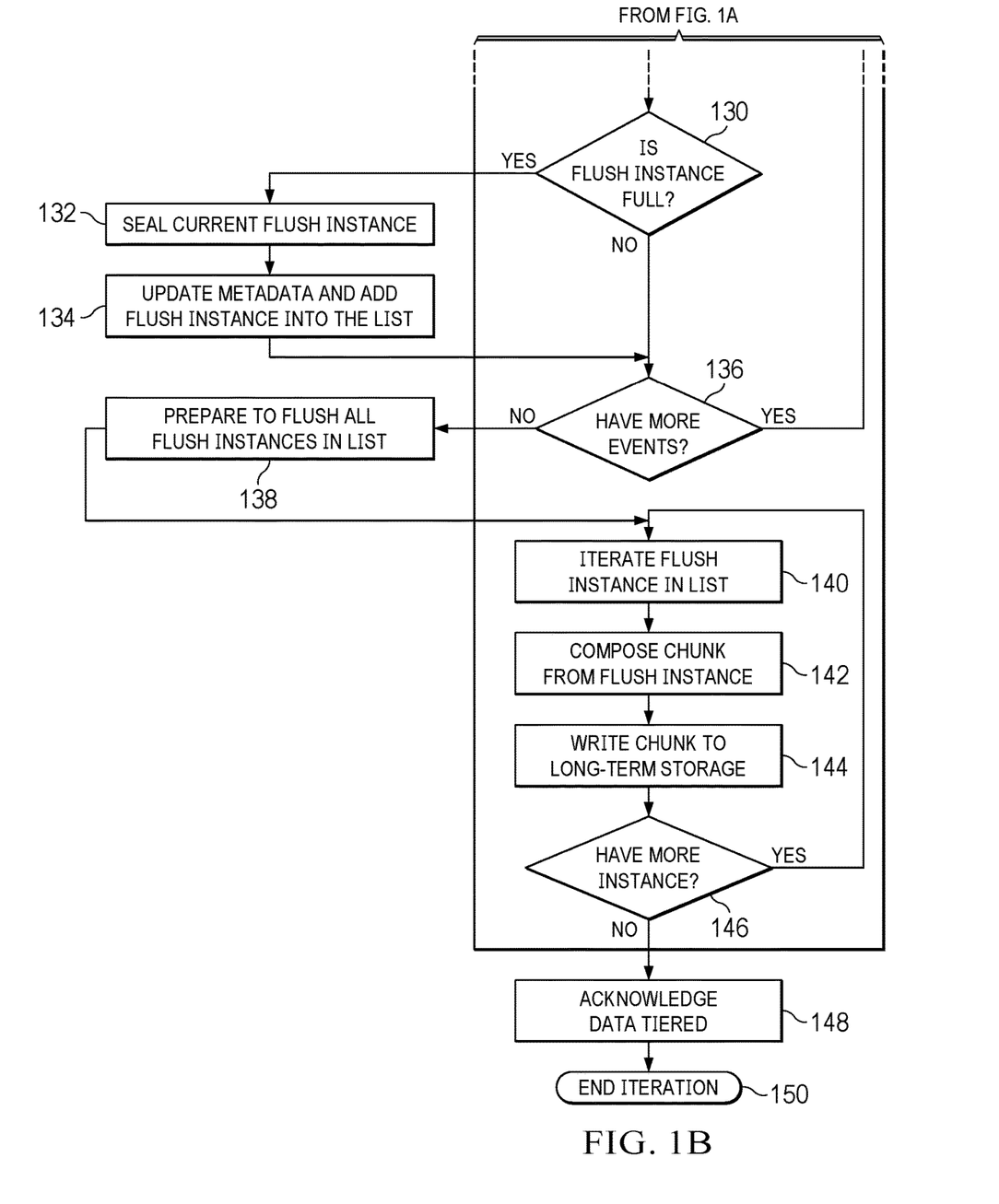

FIGS. 1A and 1B are a diagram of a system 100 for streaming data storage, in accordance with an example embodiment of the present disclosure. System 100 includes streaming data storage services 104, durable log 106, long-term storage 108, object storage 110 and tables catalog 112, each of which can be implemented in hardware or a suitable combination of hardware and software.

Streaming data storage services 104 can be implemented as one or more algorithms loaded into a working memory of a processor that cause the processor to perform the functions of receiving streaming data and creating a data structure for management of the streaming data after it has been stored. In one example embodiment, streaming data storage services 104 can dynamically allocate streaming data to a suitable storage device in association with a global unique object identifier, as discussed and described herein.

Durable log 106 can be implemented as one or more algorithms loaded into a working memory of a processor that cause the processor to perform the functions of creating a durable log of streaming data using global unique object identifiers, as discussed and described herein.

Long-term storage 108 can be implemented as one or more algorithms loaded into a working memory of a processor that cause the processor to perform the functions of migrating streaming data to long-term storage using global unique object identifiers, as discussed and described herein.

Object storage 110 can be implemented as one or more algorithms loaded into a working memory of a processor that cause the processor to perform the functions of creating an object data hierarchy to allow streaming data to be effective managed using global unique object identifiers, as discussed and described herein.

Tables catalog 112 can be implemented as one or more algorithms loaded into a working memory of a processor that cause the process to perform the functions of creating a table catalog to allow streaming data to be effectively managed using global unique object identifiers, as discussed and described herein.

At 114, the streaming data storage service begins iteration of the streaming data. In one example embodiment, iteration of streaming data can be initiated by a control plane at the beginning of an interactive session, where the streaming data is treated as a first class primitive or in other suitable manners. The algorithm then proceeds to 116.

At 116, events are obtained for batch tiering. In one example embodiment, events can be obtained over time for batch tiering to facilitate processing as parallel elements, or other suitable processes as disclosed and described herein can be implemented. The algorithm then proceeds to 118.

At 118, an in-memory data field list is prepared for flush instances, or other suitable processes as disclosed and described herein can be implemented. A flush instance can be implemented as the unit for a batch of tiering events. Events for batch tiering at 116 can generate one or more flush instances during processing, or flush instances can be generated in other suitable manners. The algorithm then proceeds to 122.

Processor 120 can be implemented in hardware or a suitable combination of hardware and software, and can include one or more non-transient data memory devices that store one or more algorithms that cause the processor, when executed, to generate flush instances, perform data tiering and to perform other suitable processes as discussed and disclosed herein.

At 122, the events are iterated in batch or other suitable processes as disclosed and described herein can be implemented. The algorithm then proceeds to 124.

At 124, it is determined whether a first event for a batch has been processed. If it is determined that a first event has been processed, the algorithm proceeds to 126, otherwise the algorithm proceeds to 128

At 126, a new flush instance is created or other suitable processes as disclosed and described herein can be implemented. The algorithm then proceeds to 128.

At 128, an event binary is added to the flush instance, or other suitable processes as disclosed and described herein can be implemented. The algorithm then proceeds to 130.

At 130, it is determined whether the flush instance full. If the flush instance is full, the algorithm proceeds to 132, otherwise the algorithm proceeds to 136.

At 132, the current flush instance is sealed or other suitable processes as disclosed and described herein can be implemented. The algorithm then proceeds to 134.

At 134, metadata of one or more sealed flush instances is updated, and any sealed flush instance is added to the in-memory data field list or other suitable locations. The algorithm then proceeds to 136.

At 136, it is determined whether there are more events waiting iteration. If yes, the algorithm returns to 122. Otherwise, proceeds to 138, starting to flush all sealed flush instances.

At 138, flush instances are prepared to be flushed or other suitable processes as disclosed and described herein can be implemented. The algorithm then proceeds to 140.

At 140, flush instances are iterated in batch or other suitable processes as disclosed and described herein can be implemented. It is noted that a flush instance needs to be present to be flushed, and that flush instances cannot be flushed if they are not present. The algorithm then proceeds to 142.

At 142, a chunk is composed from the flush instance or other suitable processes as disclosed and described herein can be implemented. The algorithm then proceeds to 144.

At 144, the chunk is written to long-term storage or other suitable processes as disclosed and described herein can be implemented.

At 146, it is determined whether more flush instances waiting iteration. If it is determined that more flush instances are present, the algorithm returns to 140, otherwise the algorithm proceeds to 148.

At 148, an acknowledgment that data has been tiered is generated or other suitable processes as disclosed and described herein can be implemented. The algorithm then proceeds to 150, where the iteration is ended.

In operation, system 100 can be used to implement an algorithm for streaming data storage, in accordance with an example embodiment of the present disclosure. While system 100 is shown with an associated algorithm in flow chart form, a person of skill in the art will recognize that the algorithm can also or alternatively be implemented using objected-oriented programming, a state diagram, a ladder diagram or in other suitable manners.

Figure 2:
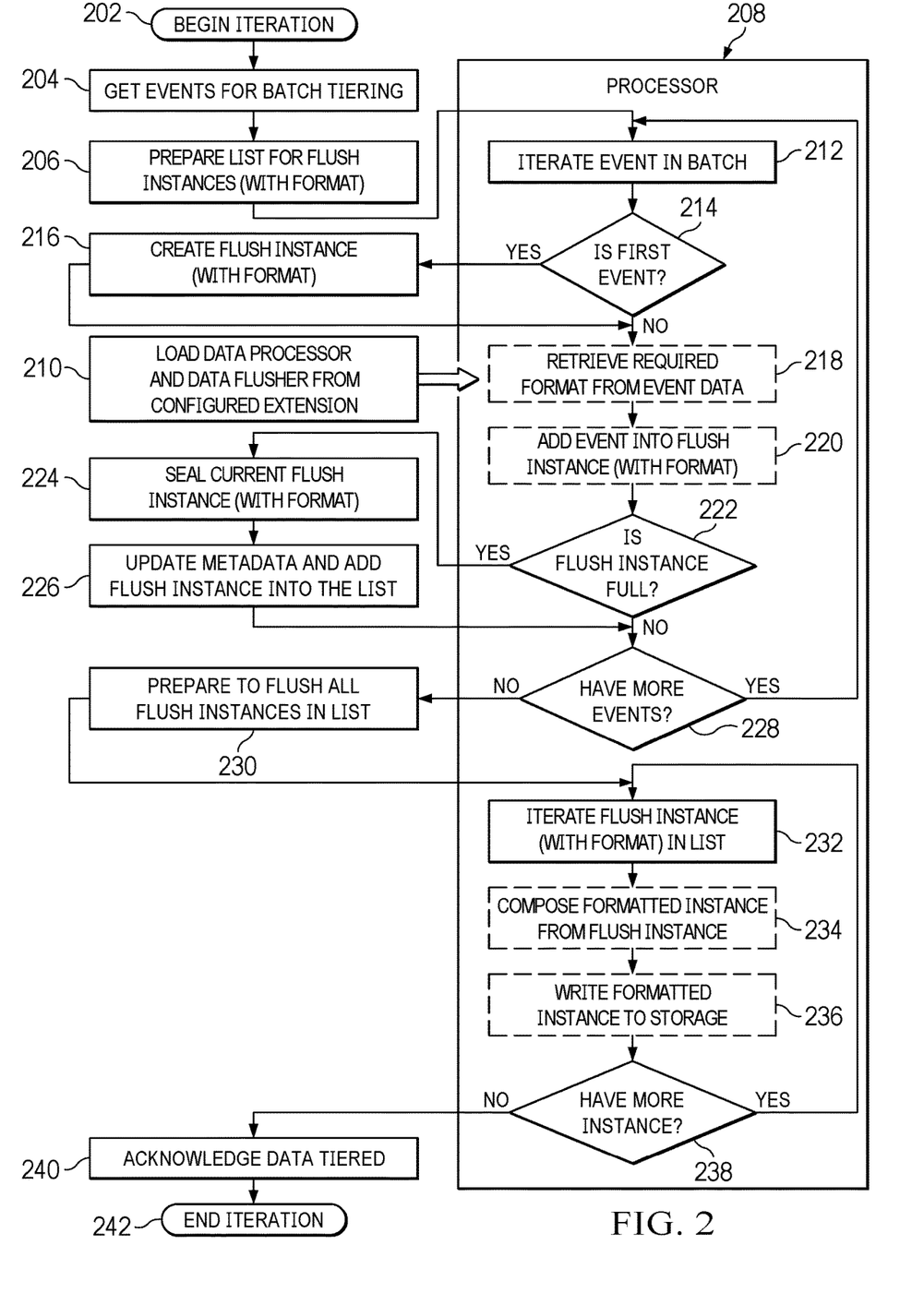
FIG. 2 is a diagram of an algorithm for streaming data storage, in accordance with an example embodiment of the present disclosure.

FIG. 2 is a diagram of an algorithm 200 for streaming data storage, in accordance with an example embodiment of the present disclosure. Algorithm 200 can be implemented in hardware or a suitable combination of hardware and software.

Algorithm 200 begins at 202, where the beginning of an iteration occurs, such as by a control plane of a streaming data storage service in response to processing by the control plane or in other suitable manners as disclosed and discussed herein. The algorithm then proceeds to 204.

At 204, events are obtained for batch tiering, such as from streaming data or using other suitable processes as disclosed and described herein. The algorithm then proceeds to 206.

At 206, an in-memory data field list is prepared for flush instances with formats, or other suitable processes as disclosed and described herein can be implemented. Flush instances can be configured to support individual or multiple kinds of formats, such binary, object batch create request for object storage as discussed in relation to algorithm 300, or other suitable formats. The algorithm then proceeds to 212.

Processor 208 can be implemented in hardware or a suitable combination of hardware and software, and can include one or more non-transient data memory devices that store one or more algorithms that cause the processor, when executed, to load and execute processor code, a data flusher from a configured extension at 210, or to perform other suitable processes as discussed and disclosed herein.

At 212, events are iterated in batch or other suitable processes as disclosed and described herein can be implemented. The algorithm then proceeds to 214.

At 214, it is determined whether this is a first event. If so, the algorithm proceeds to 216, otherwise the algorithm proceeds to 218.

At 216, a new flush instance with an associated format is created or other suitable processes as disclosed and described herein can be implemented. The algorithm then proceeds to 218.

At 218, the required format is retrieved from the event data or other suitable processes as disclosed and described herein can be implemented. The algorithm then proceeds to 220.

At 220, the event with retrieved format is added to the flush instance or other suitable processes as disclosed and described herein can be implemented. The algorithm then proceeds to 222.

At 222, it is determined whether the instance is full. If the instance is full, the algorithm proceeds to 224, otherwise the algorithm proceeds to 228.

At 224, the current flush instance with an associated format is sealed or other suitable processes as disclosed and described herein can be implemented. The algorithm then proceeds to 226.

At 226, metadata is updated for the next round and the current flush instance is added into prepared list in 206, or other suitable processes as disclosed and described herein can be implemented.

At 228, it is determined whether more events are waiting iteration. If yes, the algorithm returns to 212. Otherwise, proceeds to 230.

At 230, flush instances are prepared to be flushed or other suitable processes as disclosed and described herein can be implemented. The algorithm then proceeds to 232.

At 232, flush instances are iterated in batch or other suitable processes as disclosed and described herein can be implemented. The algorithm then proceeds to 234.

At 234, a storage formatted instance is composed from the flush instance with format or other suitable processes as disclosed and described herein can be implemented. The algorithm then proceeds to 236.

At 236, the storage formatted instance is written to storage with formats or other suitable processes as disclosed and described herein can be implemented.

At 238, it is determined whether more flush instances waiting iteration. If yes, the algorithm returns to 232, otherwise proceeds to 240.

At 240, the tiered data is acknowledged or other suitable processes as disclosed and described herein can be implemented. The algorithm then proceeds to 236.

At 242, the iteration is ended.

At 210, the data processor and data flusher can be loaded from a configured extension or other suitable processes as disclosed and described herein can be implemented.

In operation, algorithm 200 can be used to implement streaming data storage, in accordance with an example embodiment of the present disclosure. While algorithm 200 is shown in flow chart form, a person of skill in the art will recognize that the algorithm can also or alternatively be implemented using objected-oriented programming, a state diagram, a ladder diagram or in other suitable manners.

Figure 3:
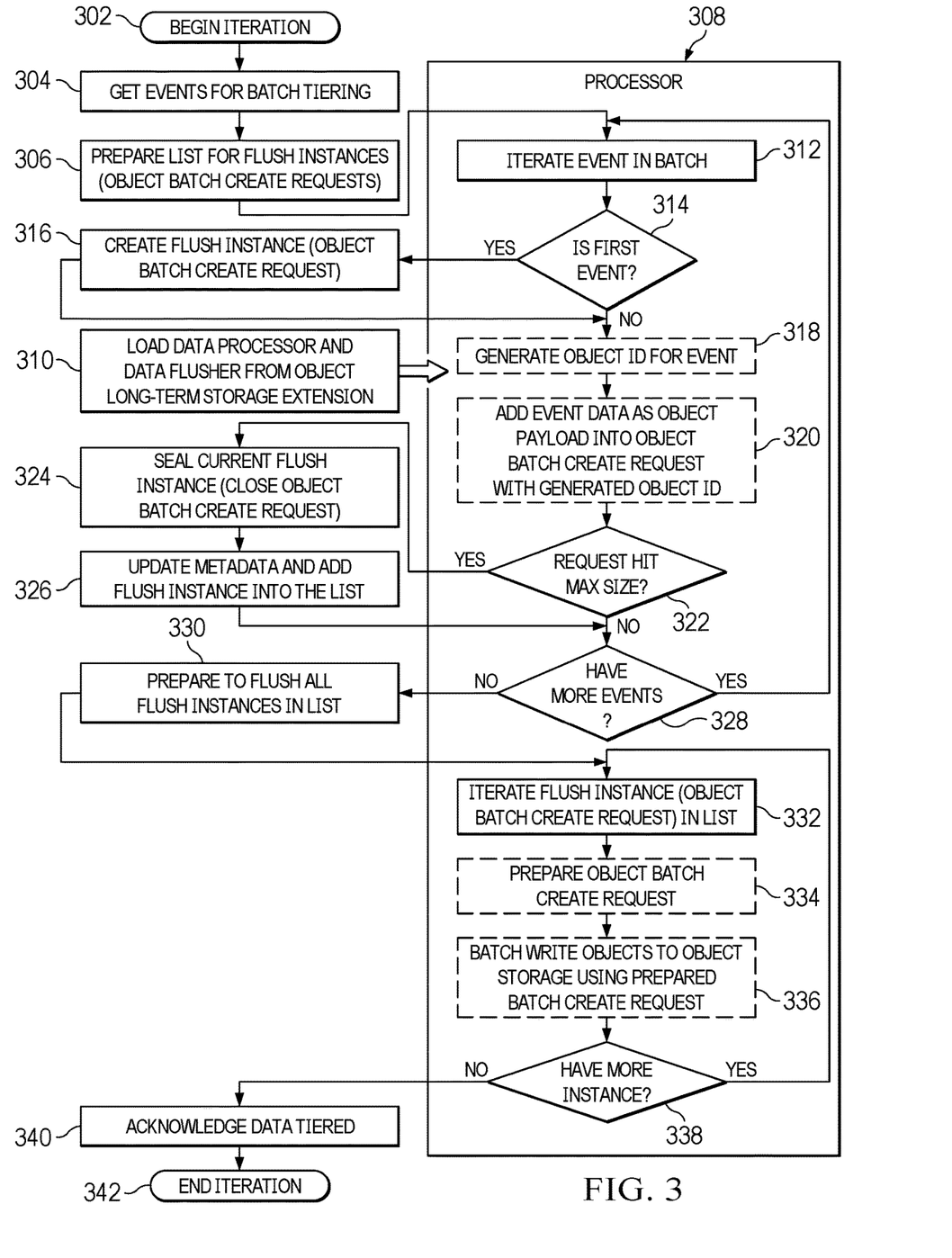
FIG. 3 is a diagram of an algorithm for streaming data object management, in accordance with an example embodiment of the present disclosure

FIG. 3 is a diagram of an algorithm 300 for streaming data object management, in accordance with an example embodiment of the present disclosure. Algorithm 300 can be implemented in hardware or a suitable combination of hardware and software.

Algorithm 300 begins at 302, where the beginning of an iteration occurs. The algorithm then proceeds to 304.

At 304, events are obtained for batch tiering, such as from streaming data or using other suitable processes as disclosed and described herein. The algorithm then proceeds to 306.

At 306, an in-memory list is prepared for flush instances or other suitable processes as disclosed and described herein can be implemented. For object storage, flush instance is object batch create request. The algorithm then proceeds to 312.

Processor 308 can be implemented in hardware or a suitable combination of hardware and software, and can include one or more non-transient data memory devices that store one or more algorithms that cause the processor, when executed, to load and execute processor code, a data flusher from a configured extension at 310, or to perform other suitable processes as discussed and disclosed herein.

At 312, events are iterated in batch or other suitable processes as disclosed and described herein can be implemented. The algorithm then proceeds to 314.

At 314, it is determined whether this is a first event. If so, the algorithm proceeds to 316, otherwise the algorithm proceeds to 318.

At 316, an object batch create request is created or other suitable processes as disclosed and described herein can be implemented. The algorithm then proceeds to 318.

At 318, an object ID for the event data is generated or other suitable processes as disclosed and described herein can be implemented. The algorithm then proceeds to 320.

At 320, event data is added as an object payload into an object batch create request with a generated object ID or other suitable processes as disclosed and described herein can be implemented. The algorithm then proceeds to 322.

At 322, it is determined whether the maximum size has been reached. If the instance is full, the algorithm proceeds to 324, otherwise the algorithm proceeds to 328.

At 324, the current object batch create request is closed or other suitable processes as disclosed and described herein can be implemented. The algorithm then proceeds to 326.

At 326, metadata is updated for the next round and instance is added into prepared list in 306, or other suitable processes as disclosed and described herein can be implemented.

At 328, it is determined whether more events waiting iteration. If yes, the algorithm returns to 312. Otherwise, proceeds to 330.

At 330, object batch create requests are prepared to be flushed, or other suitable data structures are flushed or other suitable processes as disclosed and described herein can be implemented. The algorithm then proceeds to 332.

At 332, object batch create requests are iterated in batch or other suitable processes as disclosed and described herein can be implemented. The algorithm then proceeds to 334.

At 334, object batch create request is prepared to be sent, or other suitable processes as disclosed and described herein can be implemented. The algorithm then proceeds to 336.

At 336, objects are batch written to object storage using the prepared batch request or other suitable processes as disclosed and described herein can be implemented.

At 338, it is determined whether more object batch create requests waiting iteration. If yes, the algorithm returns to 332, otherwise proceeds to 340.

At 340, the tiered data is acknowledged or other suitable processes as disclosed and described herein can be implemented. The algorithm then proceeds to 342.

At 342, the iteration is ended.

At 310, the data processor and data flusher can be loaded from a configured extension or other suitable processes as disclosed and described herein can be implemented.

In operation, algorithm 300 can be used to implement streaming data storage, in accordance with an example embodiment of the present disclosure. While algorithm 300 is shown in flow chart form, a person of skill in the art will recognize that the algorithm can also or alternatively be implemented using objected-oriented programming, a state diagram, a ladder diagram or in other suitable manners.

Figure 4:
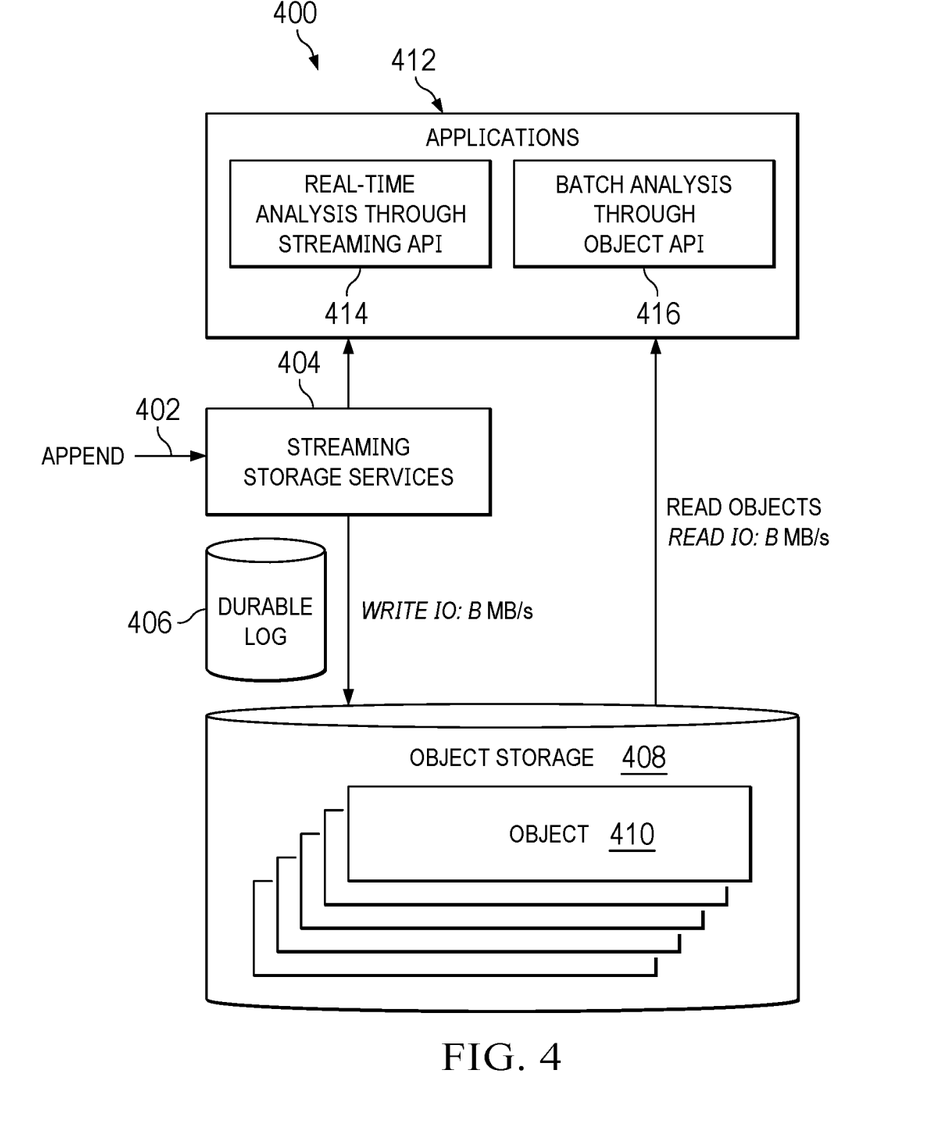
FIG. 4 is a diagram of a system for streaming data storage, in accordance with an example embodiment of the present disclosure.

FIG. 4 is a diagram of a system 400 for streaming data storage, in accordance with an example embodiment of the present disclosure. System 400 includes append command 402, streaming data storage services 404, durable log 406, object storage 408, objects 410, applications 412, real-time analysis through streaming API 414 and batch analysis through object API 416, each of which can be implemented in hardware or a suitable combination of hardware and software.

Append command 402 can be generated by one or more algorithms operating on a processor that cause the processor to generate the command when additional streaming data is received at streaming data storage service 404 or in other suitable manners. In one example embodiment, the append command 402 can be generated by a control plane of a streaming data storage service or in other suitable manners.

Streaming data storage services 404 can be generated by one or more algorithms operating on a processor that cause the processor to implement streaming data storage services.

Durable log 406 can be generated by one or more algorithms operating on a processor that cause the processor to create a durable log of streaming data and other associated data.

Object storage 408 can be generated by one or more algorithms operating on a processor that cause the processor to store data objects 410 and other associated data.

Applications 412 can be generated by one or more algorithms operating on a processor that cause the processor to perform streaming data analysis.

Real-time analysis through streaming API 414 can be generated by one or more algorithms operating on a processor that cause the processor to perform real-time analysis of streaming data from an application programming interface (API), such as to allow system 400 to interface with an external application. In this manner, new applications can be accommodated by creation of an API or in other suitable manners.

Batch analysis through object API 416 can be generated by one or more algorithms operating on a processor that cause the processor to perform batch analysis of streaming data from an application programming interface (API), such as to allow system 400 to interface with an external application. In this manner, new applications can be accommodated by creation of an API or in other suitable manners.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications, on one or more processors (where a processor includes one or more microcomputers or other suitable data processing units, memory devices, input-output devices, displays, data input devices such as a keyboard or a mouse, peripherals such as printers and speakers, associated drivers, control cards, power sources, network devices, docking station devices, or other suitable devices operating under control of software systems in conjunction with the processor or other devices), or other suitable software structures. In one exemplary embodiment, software can include one or more lines of code or other suitable software structures operating in a general purpose software application, such as an operating system, and one or more lines of code or other suitable software structures operating in a specific purpose software application. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections. The term "data" can refer to a suitable structure for using, conveying or storing data, such as a data field, a data buffer, a data message having the data value and sender/receiver address data, a control message having the data value and one or more operators that cause the receiving system or component to perform a function using the data, or other suitable hardware or software components for the electronic processing of data.

In general, a software system is a system that operates on a processor to perform predetermined functions in response to predetermined data fields. A software system is typically created as an algorithmic source code by a human programmer, and the source code algorithm is then compiled into a machine language algorithm with the source code algorithm functions, and linked to the specific input/output devices, dynamic link libraries and other specific hardware and software components of a processor, which converts the processor from a general purpose processor into a specific purpose processor. This well-known process for implementing an algorithm using a processor should require no explanation for one of even rudimentary skill in the art. For example, a system can be defined by the function it performs and the data fields that it performs the function on. As used herein, a NAME system, where NAME is typically the name of the general function that is performed by the system, refers to a software system that is configured to operate on a processor and to perform the disclosed function on the disclosed data fields. A system can receive one or more data inputs, such as data fields, user-entered data, control data in response to a user prompt or other suitable data, and can determine an action to take based on an algorithm, such as to proceed to a next algorithmic step if data is received, to repeat a prompt if data is not received, to perform a mathematical operation on two data fields, to sort or display data fields or to perform other suitable well-known algorithmic functions. Unless a specific algorithm is disclosed, then any suitable algorithm that would be known to one of skill in the art for performing the function using the associated data fields is contemplated as falling within the scope of the disclosure. For example, a message system that generates a message that includes a sender address field, a recipient address field and a message field would encompass software operating on a processor that can obtain the sender address field, recipient address field and message field from a suitable system or device of the processor, such as a buffer device or buffer system, can assemble the sender address field, recipient address field and message field into a suitable electronic message format (such as an electronic mail message, a TCP/IP message or any other suitable message format that has a sender address field, a recipient address field and message field), and can transmit the electronic message using electronic messaging systems and devices of the processor over a communications medium, such as a network. One of ordinary skill in the art would be able to provide the specific coding for a specific application based on the foregoing disclosure, which is intended to set forth exemplary embodiments of the present disclosure, and not to provide a tutorial for someone having less than ordinary skill in the art, such as someone who is unfamiliar with programming or processors in a suitable programming language. A specific algorithm for performing a function can be provided in a flow chart form or in other suitable formats, where the data fields and associated functions can be set forth in an exemplary order of operations, where the order can be rearranged as suitable and is not intended to be limiting unless explicitly stated to be limiting.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

What is claimed is:

1. A system for managing data, comprising:
a streaming data storage system operating on a processor that causes the processor to receive streaming data and to process the streaming data in response to an append command;
a long-term storage system operating on the processor that causes the processor to receive the processed streaming data from the streaming data storage system and to generate a chunk of data;
an object storage system operating on the processor that causes the processor to receive the processed streaming data from the streaming data storage system and to generate an object of data, wherein an object identifier is persisted as metadata in the streaming data storage prior to flushing the object from the processed streaming data;
a tables system operating on the processor that causes the processor to receive the processed streaming data from the streaming data storage system and to generate a table of data.

2. The system of claim 1 wherein the streaming data storage system is configured to iteratively process the streaming data and to prepare an in-memory data field list for flush instances.

3. The system of claim 1 wherein the streaming data storage system is configured to iteratively process the streaming data to select the long-term storage or the object storage and to prepare an in-memory data field list for flush instances as a unit for a batch of tiering events.

4. The system of claim 1 wherein the streaming data storage system is configured to get events for batch tiering prior to preparing data frames and to generate one or more flush instances.

5. The system of claim 1 wherein the streaming data storage system is configured to get events for batch tiering prior to iteratively processing the streaming data in batch.

6. The system of claim 1 wherein the streaming data storage system is configured to get events for batch tiering prior to iteratively processing the streaming data in batch to create a formatted instance.

7. The system of claim 1 wherein the streaming data storage system is configured to get events for batch tiering prior to iteratively processing the streaming data in batch to create an object batch create request.

8. The system of claim 1 wherein the streaming data storage system is configured to get events for batch tiering using an open format prior to preparing data frames.

9. The system of claim 1 wherein the streaming data storage system is configured to get events for batch tiering using a format readable by a third party application prior to preparing data frames.

10. The system of claim 1 wherein an object identifier is persisted as metadata in the streaming data storage prior to flushing the object from the processed streaming data for a plurality of objects.

11. A method for managing data, comprising:
receiving streaming data at a streaming data storage system operating on a processor;
processing the streaming data with the streaming data storage system in response to an append command;
receiving the processed streaming data at a long-term storage system operating on the processor from the streaming data storage system;
generating a chunk of data using the long-term storage system;
receiving the processed streaming data at an object storage system operating on the processor from the streaming data storage system;
generating an object of data using the object storage system;
receiving the processed streaming data at a tables system operating on the processor from the streaming data storage system;
generating a table of data using the tables system; and
persisting an object identifier as metadata in the streaming data storage prior to flushing the object from the processed streaming data.

12. The method of claim 11 further comprising iteratively processing the streaming data.

13. The method of claim 11 further comprising iteratively processing the streaming data to select the long-term storage or the object storage.

14. The method of claim 11 further comprising getting events for batch tiering prior to preparing data frames.

15. The method of claim 11 further comprising getting events for batch tiering prior to iteratively processing the streaming data.

16. The method of claim 11 further comprising getting events for batch tiering prior to iteratively processing the streaming data to create a formatted instance.

17. The method of claim 11 further comprising getting events for batch tiering prior to iteratively processing the streaming data to create an object batch create request.

18. The method of claim 11 further comprising getting events for batch tiering using an open format prior to preparing data frames.

19. The method of claim 11 further comprising getting events for batch tiering using a format readable by a third party application prior to preparing data frames.

20. The method of claim 11 further comprising persisting an object identifier as metadata in the streaming data storage prior to flushing the object from the processed streaming data for a plurality of objects.

\* \* \* \* \*